Dec. 26, 1939.  C. B. MOORE ET AL  2,184,429

MEASURING INSTRUMENT

Filed Feb. 4, 1938  2 Sheets-Sheet 1

INVENTOR.
WALTER G. TRUMBOWER
COLEMAN B. MOORE
BY George M Murchamp
ATTORNEY

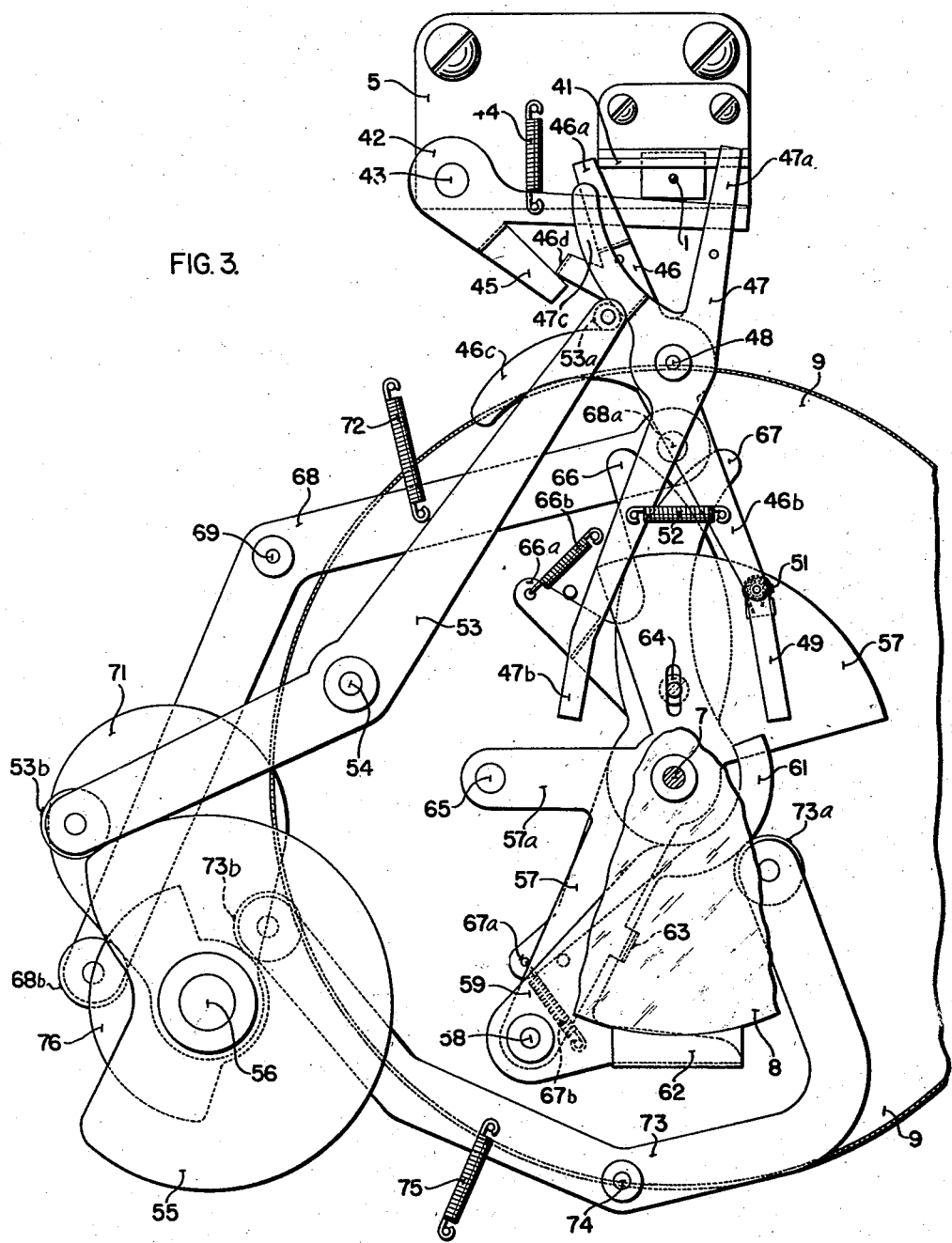

Patented Dec. 26, 1939

2,184,429

UNITED STATES PATENT OFFICE 2,184,429

MEASURING INSTRUMENT

Coleman B. Moore, Carroll Park, and Walter G. Trumbower, Philadelphia, Pa., assignors to The Brown Instrument Company, Philadelphia, Pa., a corporation of Pennsylvania Application February 4, 1938, Serial No. 188,738

11 Claims. (Cl. 74—1)

Our present invention relates to measuring instruments, and particularly to measuring instruments of the self-balancing potentiometric type which may be used to adjust a member according to the varying values of a measurable potential difference, such as the voltage of a thermocouple responsive to a variable temperature.

The general object of our invention is to provide an instrument of the above-mentioned type, which is reliable and accurate in operation and which includes means to adjust a potentiometer slide-wire in a direction and amount in proportion to the deviation of a galvanometer pointer, the coil of which may be in circuit with a thermocouple.

Improvements of the present invention were especially devised to provide a smooth and accurate adjustment of a potentiometer slide-wire by means of a friction clutch that is mounted on a cross-member, which is set in accordance with the deviation of the galvanometer pointer. This clutch is periodically actuated and is caused to grip the periphery of a disc that is rotatable with the slide-wire. After gripping the disc, the cross-member and clutch are moved to a neutral position from a position in which they were set by the deviation of the galvanometer pointer.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

Of the drawings:

Fig. 3 is a front view of another modification with certain parts removed for the sake of clearness.

Figure 1:
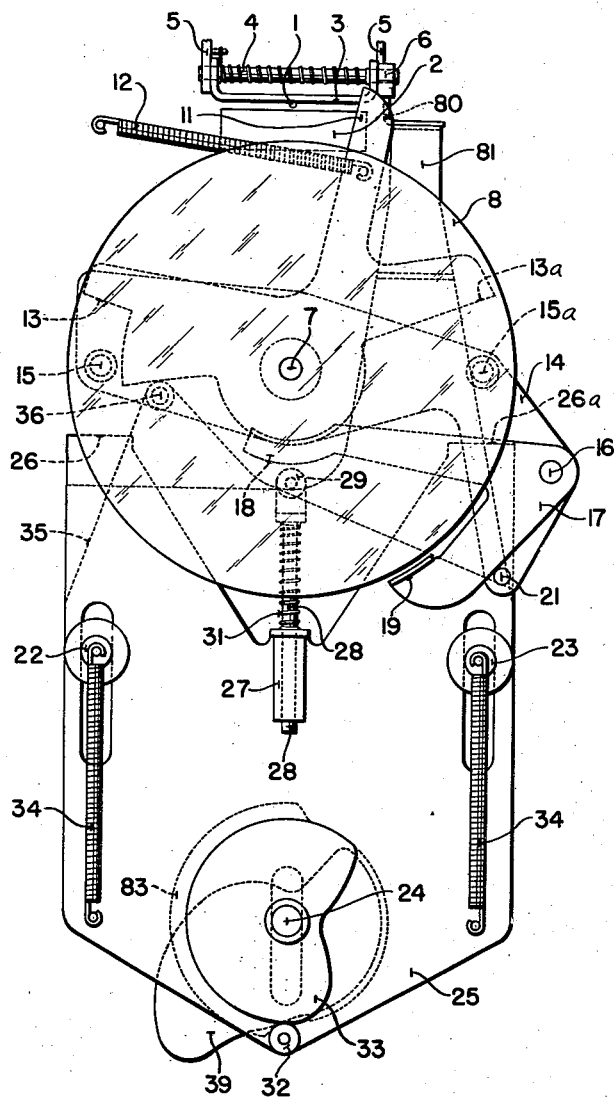
Fig. 1 shows a front view of one modification of our device.

Referring to Fig. 1, there is shown a galvanometer pointer 1 which may be connected in a potentiometer circuit with a thermocouple or some other source of variable voltage to be measured.

Potentiometric circuits of the type contemplated herein are well known, such for example as disclosed in the Harrison Patent 1,898,124, and include a known source of voltage impressed across a resistor, commonly termed the instrument slide-wire, the galvanometer and source of variable voltage being connected in series to oppose the known voltage across a variable portion of said resistor. When the variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively, proportionately to the magnitude of the increase or decrease. The invention is concerned with the means by which deflectors of said galvanometer control slide-wire adjustments to continuously rebalance the potentiometer system.

As the small current from the thermocouple or other source varies due to a change in temperature, the pointer 1 of the galvanometer will be moved from one side to the other of a neutral position. The pointer is peridoically clamped in its adjusted positions, and by means of a mechanical relay the position of the pointer is used to vary the setting of the potentiometer slide-wire. The means for clamping the pointer 1 consists of a stationary member 2 located beneath, and a movable depressor bar 3 located above it. A spring 4 is attached at one end to a stationary part 5 of the device and has its other end over the depressor bar 3 to normally bias this bar toward clamping position. A roller 6 is attached to one side of the depressor bar 3 to be contacted, at times, by a member to be later described to lift the depressor bar and free the pointer 1.

Figure 2:
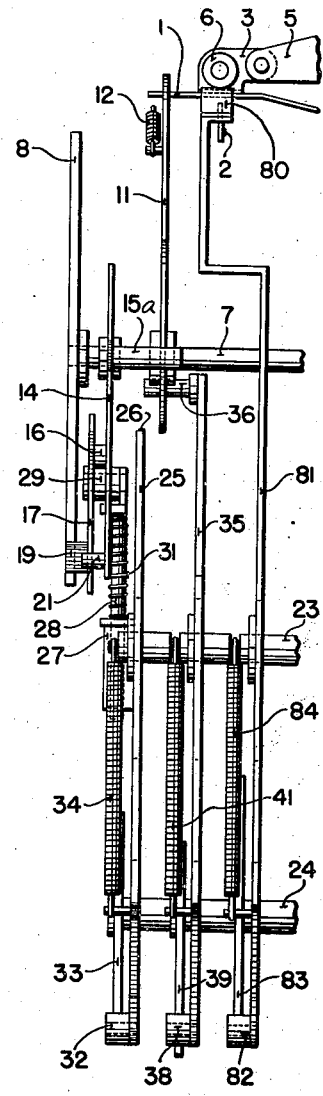
Fig. 2 is a side view taken from the right of Fig. 1.

Mounted in the frame of the device is a rotatable shaft 7 that has rigidly attached to it a disc 8 and a potentiometer slide-wire 9 (shown only in Fig. 3). The disc 8 is adapted to be rotated by an angularly shaped clutch member 17, which has an outwardly extending portion 19 to engage the periphery of the disc. The clutch 17 is pivotally mounted at 16 on a crosspiece 14, which is in turn pivotally mounted on the shaft 7. Each end of the crosspiece 14 has a pin 15 or 15a extending rearwardly therefrom to lie under the edges 13 and 13a respectively of a feeler 11 that is also pivotally mounted on shaft 7. This feeler is normally biased in a counter-clockwise direction toward the pointer 1 by a spring 12, and is moved away from the pointer by engagement between a pin 36, that is mounted on and extends forwardly from the upper end of a plate 35, (Fig. 2) and a lower edge of the feeler. The plate 35 is mounted for reciprocating movement on stud shafts 22 and 23 and cam shaft 24. The plate 35 is normally urged upward, so that pin 36 will move the feeler 12 away from pointer 1, by a pair of springs 41 attached at their lower ends to the plate and at their upper ends to shafts 22 and 23 respectively, and is periodically moved downwardly, to allow the feeler to engage the pointer, by a continuously rotated cam 39 on shaft 24 acting on roller 38 on the lower end of plate 35.

As the plate 35 is lowered by cam 39, spring 12 will move feeler 11 into engagement with pointer 1, which is now clamped, and edge 13 thereof will engage pin 15 to move the cross-bar 14 and position the clutch 17, with respect to the disc 8, to a position corresponding with the position of the pointer.

The clutch is then actuated by first moving the edge 19 into engagement with the edge of disc 8 and then moving the cross-bar 14, carrying the clutch to its neutral or mid-position. In this manner the direction and amount of rotation imparted to the disc 8 and slide-wire 9 is directly proportional to the deviation of the galvanometer pointer.

A clutch actuating plate 25 is also mounted for reciprocating movement on stud shafts 22 and 23 and the cam shaft 24. The upper edge of this plate is generally V-shaped, and has at its upper sides edges 26 and 26a, for cooperating with pins 15 and 15a, respectively. At the apex of the V-slot is a journal 27 for shaft 28, having at its upper end a combined collar and support for roller 29. Surrounding the shaft 28 between journal 27 and the collar is a spring 31 that tends to force the shaft 28 and its roller upwardly. On the lower edge of plate 25 is a roller 32 which cooperates with cam 33 on shaft 24 to at times move this plate downwardly against the bias of springs 34 to release the clutch and permit the positioning of crosspiece 14. Upon its upward movement, the roller 29 moved upwardly with plate 25, first engages the curved portion 18 of one arm of the clutch to move edge 19 of the clutch into engagement with the periphery of disc 8, then one of the edges 26 or 26a engages pin 15 or 15a, and rotates the cross-bar 14 until the other edge 26 engages the other pin 15. At this time, the cross-bar 14 will be horizontal and disc 8, shaft 7 and the slide wire 9 will have been rotated the correct amount. It is noted that a stop 21 is provided on cross-bar 14 to prevent the clutch from moving any further in a counterclockwise direction than that shown in the drawings.

The clamping bar 3 is periodically raised to free pointer 1 and lowered to grasp it by contact between the roller 6 on member 3 and edge 80. This edge is mounted on an off-set extension of a plate 81 that is also mounted for reciprocating movement on shafts 22, 23 and 24. On the lowest edge of this plate 81 is a roller 82 that is held in contact with a cam 83, also mounted on shaft 24, by springs 84 attached at their lower ends to plate 81 and at their upper ends to shafts 22 and 23.

In the operation of the device the cams 33, 39 and 83 on shaft 24 are rotated with the shaft in a clockwise direction. To begin a cycle of operation, assume that the low portion of cam 39 is over roller 38, and that plate 35 is in its highest position. Therefore pin 36 has moved feeler 11 to its extreme clockwise position, so that edge 13a has engaged and moved pin 15a on crosspiece 14 to a position slightly beyond that it would assume for an extreme right-hand deflection of pointer 1. At this time the high portion of cam 83 has just contacted roller 82 to lower plate 81, and edge 80 so that pointer 1 is clamped in position by parts 2 and 3. The high portion of cam 33 is also, at this time, over roller 32, so that the edges 26 and 26a are in their lowest positions.

As shaft 24 rotates, cam 39 will gradually force plate 35 and its pin 36 downwardly so that spring 12 can move feeler 11 toward the left into engagement with the pointer 1. The first part of the movement of feeler 11 is free, until edge 13 engages pin 15, thereafter the cross-bar 14 and clutch 17 are moved until the feeler contacts the pointer 1, and is held thereby in its then position. Plate 35 continues its downward movement until it reaches a position to which the feeler 11 would move for an extreme left-hand deflection of the pointer.

During the time that the above-described positioning operations have been taking place, the plate 25 has been in its lowest position. Continued rotation of shaft 24 and cam 33 now bring the low portion of the cam over roller 32 so plate 25 can rise under the influence of springs 34. As the plate rises edges 26 and 26a will rise to come into contact with pins 15 and 15a. Just before either edge 26 would strike a pin 15 or 15a in its lowest position, roller 29 will engage the arcuate section 18 of the clutch and thus pivot the clutch around point 16, to bring edge 19 into engagement with the periphery of disc 8, so that as the member 14 moves, the clutch 17 and disc 8 will be moved therewith. If the pointer were in mid-position when engaged, the member 14 will have been moved to a horizontal position as shown, so that on their upward movement both edges 26 will engage pins 15 and 15a at the same time. No movement of the clutch or disc 8 will then result. If, however, the pointer 1 is deflected to either side of its mid-position, the member 14 will be displaced from the horizontal and one of pins 15 or 15a will be lower than the other. Therefore upon upward movement of plate 25 the lower of pins 15 and 15a will be contacted first and the cross-bar 14 with its clutch 17 will be rotated in a corresponding direction until the other pin is contacted by the other edge 26 or 26a. This brings the cross-bar to its horizontal and neutral position. The movement of the cross-bar and clutch rotates the disc 8 and slide-wire 9 in a direction and amount to tend to balance the potentiometer circuit of which the slide-wire is a part.

Continued rotation of shaft 24 causes cam 33 to lower plate 25, and then brings the lowest portion of cam 39 over roller 38. Pin 36 of plate 35 then forces feeler 11 in a clockwise direction to its extreme right-hand position and edge 13a during this movement engages pin 15a to move crosspiece 14 to an initial clockwise position beyond that which it would assume for a right-hand deflection of the pointer. As the high portion of cam 39 then starts to come over roller 38 a new cycle is begun.

The modification of Fig. 3 has the same type of clutch for rotating the slide-wire that is disclosed in Fig. 1. The manner of positioning the clutch supporting member and then moving it to rotate disc 8 and the slide-wire is different, however. In this modification a pair of scissor-like arms are used to measure the position of the pointer, and to simultaneously move the clutch carrying member to a position corresponding thereto. The clutch carrying member is then moved back to neutral position by either one of a pair of actuating members, depending upon the direction of its deflection.

The galvanometer pointer 1 is shown below a stationary abutment 41 and above a clamping bar 42 pivoted at 43, and normally biased upwardly by spring 44. This clamping bar has a finger 45 integral therewith that is adapted to be engaged by another finger 46d to move it out of clamping engagement with the pointer.

The clutch carrying member of this modification is adapted to be positioned in accordance with the movements of a pair of scissors members 46 and 47 that are pivotally mounted on pin 48 and are adapted to have their upper ends 46a and 47a brought into engagement with pointer 1 by the pull of spring 52 on their lower ends 46b and 47b. Extending from the upper end of each scissor member is a curved arm 46c and 47c respectively, that are held apart by a roller 53a on a lever 53 that is pivoted at 54, and has on its other end a roller 53b bearing on a cam 55. As the cam 55 rotates with constantly driven shaft 56 to bring its low portion under roller 53b, spring 52 will pull ends 46b and 47b of the scissors members toward each other until these ends engage and move a pin 64 on a clutch carrying member 57 that is movable around shaft 7. This movement continues until both ends 46a and 47a engage pointer 1 to positively position end 46b and part 49 together with pin 64 and the clutch member 57. As the lower ends of these members come together, an extension 49 on the lower end of member 46 is adapted to give in a counter-clockwise direction against the bias of spring 51 thereby overcoming lost motion due to wear on the scissor parts. This member 57 has pivoted at 58 on its lower end, a bell-crank shaped clutch member 59, one arm of which is formed with an arcuate section 61, while the other arm has a piece of friction material 62 fastened thereto that is adapted to engage the periphery of disc 8. The member 57 has an abutment 63 on it against which the clutch member will normally fall under its own weight to disengage the friction shoe 62 from the periphery of disc 8.

Also and pivotally mounted on shaft 7 are two actuating members 66 and 67, each of which has an arm 66a or 67a that is adapted to engage pin 65 on the clutch carrying member 57 to move the member and clutch to a neutral point and thereby move the disc 8 and slide-wire 9 a corresponding amount. The members 66 and 67 are urged into the positions shown by springs 66b and 67b, but are periodically moved into the positions in which portions 66a and 67a engage pin 65 when the latter is in the position of Fig. 3, by a separating roller 68a. Roller 68a is carried by lever 68 pivoted at 69 and given periodic clockwise movements under the action of a cam 71 fixed to shaft 56, which engages a roller 68b of lever 68.

In order to hold the friction shoe 62 of the clutch against the periphery of the disc 8 as member 57 is moved, there is provided a lever 73, pivoted at 74, which has a roller 73a adapted to bear on the arcuate section 61 of the clutch member. This lever is biased in a counterclockwise direction by spring 75 that tends to hold roller 73a against the clutch member and to hold roller 73b against cam 76, which is also fastened to shaft 56.

In the operation of the device, the shaft 56 and its cams are rotated in a counter-clockwise direction. The parts are shown in the drawings in the position they assume after the clutch supporting member 57 has been set to a position corresponding to mid-position of the pointer. The scissors members 46 and 47 have returned to their inactive position and the galvanometer pointer has been unclamped. The cam 76 is shown in a position in which its low portion is under roller 73b and roller 73a is bearing on the curved portion 61 of the clutch member to hold friction shoe 62 against the periphery of disc 8.

Continued rotation of the shaft 56 from the position shown will bring the high portion of cam 71 under roller 68b, and the roller 68a on the other end of lever 68 will be forced downwardly between the curved edges of members 66 and 67 to move arm 66a downwardly, and arm 67a upwardly into engagement with pin 65 on the clutch supporting member 57. Since member 57 has been positioned for mid-position of the pointer, the arms 66a and 67a will engage pin 65 at the same time, and there will be no movement of member 57. If, however, the pointer were not in mid-position, the pin 65 would be positioned either above or below the horizontal. In this case either arm 66a or 67a would engage pin 65 to move it to a horizontal position and thereby, through the clutch 62, rotate disc 8 and its attached slide-wire 9 a corresponding amount to rebalance the potentiometer circuit of which slide-wire 9 is a part.

Following the engagement of pin 65 by members 66 and 67, the high portion of cam 76 comes under roller 73b to move lever 73 in a clockwise direction. This permits clutch member 59 to also move in a clockwise direction until it rests against edge 63, thereby disengaging shoe 62 from the disc 8. Shortly after the clutch is disengaged, the low portion of cam 55 will come under roller 53b and lever 53 will be moved counterclockwise to move roller 53a out from between the arms 46c and 47c under the action of spring 52 which, tending to pull the lower ends of scissors members 46 and 47 together, will tend to move the roller 53a outward. As the arms 46a and 47a move together, the finger 46d, moving in a clockwise direction, will recede from finger 45 to allow the clamping bar 42 to rise under the force of spring 44 and clamp the pointer in place. Continued movement of arms 46a and 47a will bring them into contact with the pointer 1 in its then position. As both members 46 and 47 are pivoted around 48, no matter what the position of the pointer, they will be brought together and the pin 64 and member 57 will be positioned accordingly for the next cycle. As cam 55 continues rotating, its high portion will force roller 53a in between arms 46c and 47c to open the scissors members in preparation for a repetition of the cycle just described.

It will be seen from the above detailed description that we have provided a simple and effective means for moving a potentiometer slide-wire in either direction from a single clutch member. This device is positive in operation and is easy to manufacture and assemble. As has been shown, either a single feeler or a pair of feelers may be used, as desired, to set the clutch member to a position corresponding to that of the galvanometer pointer.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent, is:

1. In a measuring instrument, a shaft, a part pivoted thereon, an angular clutch member pivoted on said part, said clutch member having on one arm a clutch edge, a disc fastened to said shaft, means acting on one arm of said clutch member to force said edge into engagement with the periphery of said disc, and means for moving said part to thereby move said clutch member and disc, a control member and means for moving the control member from said disc.

2. In a measuring instrument, a shaft, a part pivoted thereon, an angularly shaped clutch member pivoted on said part, a disc on said shaft, a pointer, a feeler adapted to contact said pointer, means for moving said part by said feeler to a position corresponding to the position of said pointer, means for forcing an edge of said clutch member against said disc, and means for thereafter moving said part to a predetermined position to thereby move said clutch member and disc.

3. In a measuring instrument, a pointer, a feeler adapted to contact said pointer, a shaft, a part rotatable on said shaft and adapted to be moved by said feeler to a position corresponding to the position of said pointer, an angular clutch member pivoted to said part and having on one arm an abutment, said clutch member having on the other arm a clutch surface, a disc fastened to said shaft adapted to be contacted by the clutch surface, means for moving said part by said feeler, means acting on said abutment surface to pivot the clutch edge into gripping engagement with the disc, and means for thereafter moving said part to a predetermined position to thereby move the clutch member and disc.

4. In a measuring instrument, a pointer, a feeler adapted to engage said pointer, a shaft, a part rotatable on said shaft, an angular clutch member pivoted to said part, one arm of said clutch member having an arcuate surface, the other arm having a clutch edge, a disc on said shaft adapted to have its periphery contacted by said edge, a reciprocating plate having means thereon to contact said arcuate surface to force the clutch edge into contact with said disc and means thereon to engage said part, means to pivot said feeler into engagement with and move said part to a position corresponding to that of said pointer, and means to thereafter move said plate to move the clutch edge into engagement with the disc and turn said part and clutch to a predetermined position, thereby moving said disc.

5. In a measuring instrument, a shaft, a part on said shaft, an angular clutch member pivoted to said part, said clutch member having on one arm a clutch edge and on the other arm an arcuate surface, a disc on said shaft adapted to have its periphery engaged by said edge, a first plate, means to reciprocate said plate, means operated by said plate to move said part from an initial position, a second plate, means to reciprocate said second plate, means on said second plate to contact said arcuate surface to move said edge into engagement with said disc, and means on said second plate to engage said part to thereby move said part and clutch member, to in turn move said disc.

6. In a measuring instrument, a movable pointer, means for clamping said pointer in place, a feeler for contacting said pointer, a shaft, a disc on said shaft, a part rotatable on said shaft, means for moving said part by said feeler to a position corresponding to the position of said pointer, an angular clutch member pivoted on said part, one arm of said member having an arcuate surface and the other arm having an edge adapted to contact the periphery of said disc, a first plate, means for reciprocating said plate, means on said plate for moving said feeler out of contact with said pointer, a second plate, means for reciprocating said second plate, means on said second plate to engage said arcuate surface and force said edge into contact with said disc, and means also on said second plate to engage said part and move it to a predetermined position.

7. In a measuring instrument, a shaft, a part pivoted on said shaft, a clutch member pivoted on said part, said clutch member being angular in shape and having an arcuate surface on one arm and an edge on the other arm, a disc mounted on said shaft, the periphery of said disc being adapted to be engaged by said edge, a movable pointer, means for moving said part from an initial position to a position corresponding to that of said pointer, means engaging said arcuate surface to thereby bring said edge against said disc, and means to move said part to a predetermined position to thereby move said clutch member and cause it to rotate said disc.

8. A device in accordance with claim 7 in which said clutch member is biased to move so that the edge is away from said disc, and a projection on said part to limit movement of said clutch member.

9. In a measuring instrument, a member movable in accordance with a variable condition, means for measuring the position of said member, a pivoted part adapted to be moved by said measuring means to a position corresponding to the position of said member, an angularly shaped clutch member pivoted to said part, a shaft, a disc attached to said shaft and adapted to be engaged by an arm of said clutch, an actuating member, means to move said actuating member into engagement with the other arm of said clutch member to thereby pivot said disc engaging arm against said disc, said means thereafter moving said part to a predetermined position, whereby said clutch member and disc will be moved.

10. In a measuring instrument, a member deflectable in accordance with a measuring instrument, a feeler adapted to contact said member, a shaft, a part mounted thereon, means to position said part from said feeler to a position corresponding to the position of said member, an angularly shaped clutch arm on said part, one arm of said clutch member having an arcuately shaped end and the other arm having a clutch edge, a disc on said shaft, the periphery of which is adapted to be engaged by said clutch edge, means to move said clutch edge into engagement with the periphery and to thereafter move said part to a predetermined position to thereby move said clutch member and disc, a control member and means to move said control member by movement of said disc.

11. In a measuring instrument, a member deflectable in accordance with a measurable condition, means for periodically clamping said member in position, a pivoted feeler, means for moving said feeler from an initial position into engagement with said member, a shaft, a part pivoted on said shaft adapted to be moved by said feeler from an initial position to a position corresponding to that of said member, a clutch member pivoted on said part and having an arm with a clutch edge and an actuating arm, a disc on said shaft adapted to have its periphery engaged by said clutch edge, means to engage said actuating arm and thereby move said clutch edge into contact with the periphery of said disc, said means thereafter moving said part to a predetermined position to thereby rotate said part, clutch member and disc.

COLEMAN B. MOORE.
WALTER G. TRUMBOWER.